(12) United States Patent
Bengtsson et al.

(10) Patent No.: US 11,704,960 B2
(45) Date of Patent: Jul. 18, 2023

(54) COIN HANDLING APPARATUS

(71) Applicant: SCAN COIN AB, Malmö (SE)

(72) Inventors: Kristian Bengtsson, Bjärred (SE); Victor Wallman-Carlsson, Malmö (SE); Dan Wigenstam, Eslöv (SE)

(73) Assignee: SCAN COIN AB, Malmö (SE)

( * ) Notice: Subject to any disclaimer, the term of this patent is extended or adjusted under 35 U.S.C. 154(b) by 332 days.

(21) Appl. No.: 16/645,150

(22) PCT Filed: Aug. 29, 2018

(86) PCT No.: PCT/SE2018/050863
§ 371 (c)(1),
(2) Date: Mar. 6, 2020

(87) PCT Pub. No.: WO2019/050452
PCT Pub. Date: Mar. 14, 2019

(65) Prior Publication Data
US 2021/0407242 A1    Dec. 30, 2021

(30) Foreign Application Priority Data

Sep. 11, 2017   (SE) .................................. 1751101-5

(51) Int. Cl.
*G07F 1/04* (2006.01)
*F16L 27/12* (2006.01)
(Continued)

(52) U.S. Cl.
CPC ............ *G07F 1/04* (2013.01); *F16L 27/0849* (2013.01); *F16L 27/12* (2013.01); *F16L 27/125* (2013.01);
(Continued)

(58) Field of Classification Search
CPC .. G07D 5/00; G07D 1/00; G07D 9/00; G07D 2201/00; F16L 27/0849; F16L 27/12;
(Continued)

(56) References Cited

U.S. PATENT DOCUMENTS

| 5,758,907 A | 6/1998 | Dole et al. |
| 7,625,272 B1 | 12/2009 | Moreland et al. |

(Continued)

FOREIGN PATENT DOCUMENTS

| CL | 199701500 A1 | 6/1998 |
| CL | 199901684 A1 | 3/2000 |

(Continued)

OTHER PUBLICATIONS

ISR PCT/SE2018/050863, prepared by the SE patent office dated Jan. 14, 2019.

*Primary Examiner* — Jeffrey A Shapiro
(74) *Attorney, Agent, or Firm* — Brooks Kushman PC; John E. Nemazi

(57) ABSTRACT

A coin handling apparatus having: a first coin position; a second coin position; and a pipe for transporting coins from the first to the second coin position. The pipe is jointed and has a rigid, elongate element having a straight, elongate portion and a curved portion at a first end of the straight, elongate portion. The pipe further includes a rigid, curved element. The curved portion and the curved element are connected to define a continuous passageway through the curved element and the elongate element. The curved element, at least before mounting of the pipe in the coin handling apparatus, is rotatable in relation to the elongate element, such that an angle between a first opening of the curved element and a direction extending along the straight elongate portion is variable.

13 Claims, 5 Drawing Sheets

(51) Int. Cl.
  *F16L 27/08* (2006.01)
  *G07D 1/00* (2006.01)
  *G07D 9/00* (2006.01)
  *G07G 1/00* (2006.01)
(52) U.S. Cl.
  CPC ............... *G07D 1/00* (2013.01); *G07D 9/00* (2013.01); *G07D 9/008* (2013.01); *G07G 1/0018* (2013.01); *G07D 2201/00* (2013.01)
(58) Field of Classification Search
  CPC ....... F16L 27/125; F16L 27/02; F16L 27/093; G07F 1/04; G07G 1/0018; G07G 1/0027
  See application file for complete search history.

(56) References Cited

U.S. PATENT DOCUMENTS

| | | | |
|---|---|---|---|
| 9,092,924 B1 | 7/2015 | Rasmussen et al. | |
| 10,023,389 B1* | 7/2018 | Priepke | A01D 43/087 |
| 10,746,332 B1* | 8/2020 | Haines | F16L 27/06 |
| 2002/0170285 A1* | 11/2002 | Dean | F16L 27/12 60/257 |
| 2004/0200690 A1 | 10/2004 | Adams et al. | |
| 2004/0231956 A1* | 11/2004 | Adams | G07D 1/04 194/217 |
| 2005/0191954 A1 | 9/2005 | Vidondo | |
| 2006/0012166 A1* | 1/2006 | Siferd | F16L 27/0849 285/184 |
| 2006/0070843 A1* | 4/2006 | Zwieg | G07D 9/00 194/346 |
| 2006/0162179 A1* | 7/2006 | Kong | F16L 5/02 34/235 |
| 2006/0217052 A1* | 9/2006 | Barnekow | G07D 3/14 453/3 |
| 2015/0292664 A1* | 10/2015 | Mann | B23K 20/129 156/308.2 |
| 2018/0128170 A1* | 5/2018 | Owdeh | F02C 6/08 |
| 2018/0180205 A1* | 6/2018 | Olson | F16L 27/12 |
| 2019/0162344 A1* | 5/2019 | Cardinale | F16L 37/0915 |

FOREIGN PATENT DOCUMENTS

| | | |
|---|---|---|
| CL | 200202969 A1 | 11/2003 |
| CL | 200500079 A1 | 12/2005 |
| EP | 1020818 A1 | 7/2000 |
| EP | 2175429 B1 | 8/2012 |
| EP | 2690604 A1 | 1/2014 |
| FR | 2910953 B1 | 4/2011 |
| JP | 5219290 U | 2/1977 |
| WO | 03/056522 A1 | 7/2003 |
| WO | 2006019917 A1 | 2/2006 |
| WO | 2007035420 A2 | 3/2007 |
| WO | 2014058111 A1 | 4/2014 |

* cited by examiner

COIN HANDLING APPARATUS

CROSS-REFERENCE TO RELATED APPLICATIONS

This application is the U.S. national phase of PCT Application No. PCT/SE2018/050863 filed on Aug. 29, 2018, which claims priority to SE Patent Application No. 1751101-5 filed on Sep. 11, 2017, the disclosures of which are incorporated in their entirety by reference herein.

TECHNICAL FIELD

The present inventive concept relates to a coin handling apparatus. In particular, the present inventive concept relates to a coin handling apparatus, wherein coins are transported between a first and a second coin position.

BACKGROUND

Within fields related to retail among others, dispensing of coins from a coin handling apparatus into cash drawers is known and widely used. Typically, a cashier may fill a cash drawer before the beginning of a work shift. The coin handling apparatus may also be configured to receive coins after a work shift, such that the coins may be recycled. The coins may thus be sorted and stored by denomination within the coin handling apparatus.

However, cash drawers may have many different varying configurations. Cash drawers may have different dimensions or configurations of coin compartments in the cash drawer depending on the application they are to be used in, e.g. a type of cash register machine in which the cash drawer is used. Also, users of a coin handling apparatus for dispensing coins may have different preferences or needs with regard to which denominations of coin is to be filled into the respective coin compartments.

A manufacturer of coin handling apparatuses may force customers to use a specific type of cash drawer associated with the apparatus. This is suboptimal with regard to customer needs.

Alternatively, a manufacturer may market a plurality of different configurations of coin handling apparatuses in order to support different preferences or needs of customers. However, this is an expensive solution, both time- and resource-wise, as separate manufacturing lines may be needed for each configuration and the manufacturer may need to administer a large number of different products.

In EP 2690604 is disclosed a coin deposit and dispensing apparatus having a till filling distributor unit comprising a set of a plurality of releasably mounted till filling distributors. The function of the till filling distributor is to guide coins from a dispenser to a portable cash receptacle. The composition of till filling distributors in a particular set is chosen based on the amount of coin types that is to be processed and on the design of the particular portable cash receptacle that is to be used.

Although the coin deposit and dispensing apparatus provides some flexibility in guiding coins from dispensers to a compartment in a cash drawer, the coin deposit and dispensing apparatus may only support relatively similar cash drawers and similar positions of coin compartments that are to receive a specific denomination. Thus, there exists a need for a coin handling apparatus which may transport coins from a first position to a second position with an improved flexibility of the relation between the first position and the second position, in particular, for use of such coin transport in a coin handling apparatus that is configured to deposit coins to a cash drawer.

SUMMARY

An objective of the present inventive concept is to provide a coin handling apparatus which may be configured with a flexible relation between a first and a second position for transporting coins between the first and second position.

These and other objects of the invention are at least partly met by the invention as defined in the independent claims. Preferred embodiments are set out in the dependent claims.

According to an aspect of the present inventive concept there is provided a coin handling apparatus comprising a first coin position, a second coin position and a pipe, which is arranged between the first coin position and the second coin position for transporting coins from the first coin position to the second coin position, wherein the pipe is jointed and comprises an elongate element, wherein the elongate element is rigid and has a straight, elongate portion and a curved portion at a first end of the straight, elongate portion, and a curved element, wherein the curved element is rigid and has a first opening at a first end and a second opening at a second end opposite to the first end, wherein the curved portion of the elongate element and the curved element are connected at the second end of the curved element to define a continuous passageway through the curved element and the elongate element of the pipe and wherein the curved element, at least before mounting of the pipe in the coin handling apparatus, is rotatable in relation to the elongate element, such that an angle between the first opening of the curved element and a direction extending along the straight, elongate portion of the elongate element is variable.

This apparatus provides a passageway between the first and second coin positions which is readily adjusted at least when the coin handling apparatus is assembled.

A coin handling apparatus may be used for processing of coins and coins may need to be transported in the apparatus between different positions. The coin handling apparatus may need to be adapted to different circumstances, such that the coin handling apparatus may need to be manufactured in different variations depending on the circumstances the coin handling apparatus is to be used in. For instance, if the coin handling apparatus is configured to dispense coins to a cash drawer, the apparatus may be adapted based on the flexibility of mounting the pipes for transporting coins.

Thus, a coin handling apparatus is provided with the flexibility needed for supporting variations of cash drawers while having a minimal differentiation in variations of the coin handling apparatus. Same components may be used and it is a simple task in assembly of the coin handling apparatus to mount the components in a way that supports the specific variation of the cash drawer that is desired.

However, it is also realized that other types of coin handling apparatuses may need a flexibility in transporting coins between two positions, not only for outputting coins to a cash drawer. For instance, a payment machine, wherein coins are used for payments may need to support variations where positions of input slots or output positions are varied in dependence e.g. of where the payment machine is installed. In such application, it may also be beneficial to make use of the flexibility of transporting coins between two positions that may be differently related to each other for different variations of the apparatus.

The pipe of the coin handling apparatus has a flexible configuration that allows the pipe to define passageways between first and second coin positions which have different relations in lateral and/or vertical directions. Thus, the same type of pipe may be used in variations of the coin handling apparatus and the pipe may be adjusted during assembly of the coin handling apparatus to the specific variation of the coin handling apparatus desired.

The pipe may provide a well-controlled passageway from the first coin position to the second coin position, Thanks to the elongate element and the curved element being rigid, it may be ensured that a slope may be provided throughout the passageway. This implies that gravity may act on coins to pass the coins through the passageway and that there is a very small risk that coins will get stuck in the passageway.

Thanks to the pipe being jointed with the possibility of rotating the curved element in relation to the elongate element, it is ensured that an angle may be adapted, such that a direction in which the elongate element extends from a first position and/or towards a second position may be controlled.

A length of the elongate element may also be adjustable such that the pipe may be adapted to different distances between the first and second coin positions.

During assembly of the coin handling apparatus, before or after mounting of the pipe in the coin handling apparatus, the configuration of the pipe may be fixated, e.g. by permanently attaching the curved element to the elongate element, so as to ensure that the pipe does not change configuration during use of the coin handling apparatus. However, the configuration of the pipe need not necessarily be fixated during mounting, which may facilitate changing configuration of the pipe and, hence, the coin handling apparatus, after the coin handling apparatus has been manufactured.

According to one embodiment, the elongate element and the curved element are configured to define a minimum angle between the first opening of the curved element and a direction extending along the straight, elongate portion of the elongate element in dependence of the rotation of the curved element in relation to the elongate element.

This has the effect of constraining the angle in which the elongate portion of the pipe is mounted in the coin handling apparatus in relation to gravity, making it impossible for the assembler of the coin handling apparatus to mount the pipe at an angle where the coins do not readily glide on the inner surface of the pipe.

The minimum angle may e.g. depend on whether the opening of the curved element is to be mounted in a horizontal plane. In one embodiment, when the curved element is in fact to be mounted in a horizontal plane, the minimum angle may be 30°, or in the range of 25-35°. Such angles may ensure that the coins will not get stuck by friction in the passageway defined by the pipe. However, it should be realized that the minimum angle may be different and smaller than 30°, e.g. if an inner surface of the pipe is treated to reduce friction between coins and the surface.

According to one embodiment, the elongate element comprises at least a first and second part, which at least before mounting of the pipe in the coin handling apparatus are telescopically movable in relation to each other in the elongate portion of the elongate element.

This eliminates the need for cutting and fitting an elongate element of desired length to the desired angle with respect to the first and second coin positions, as the elongate element may simply be adjusted to the desired length by changing the relation of the telescopically movable first and second parts.

According to one embodiment, the first and second parts comprise interlocking elements defining a set of pre-defined relations between the first and second parts.

The interlocking elements may engage in order to stably maintain the first and second parts in a selected setting to each other. Further, an assembler may operate on an interlocking element in order to easily change a setting of the first and second parts. The interlocking elements may for instance comprise a spring-biased pin on one of the first and second parts and a set of holes on the other of the first and second parts. This allows for easily changing the length of the elongate element, while the selected length may be maintained once selected.

The first and second parts may be provided with markers on at least one of the parts for indicating a relationship between the first and second parts. The markers may thus be used to define a configuration of a length of the elongate element corresponding to selecting a specific setting of the interlocking elements. This allows for clear instructions to be provided to the assembler of the coin handling apparatus, such that the assembler may immediately choose the correct configuration when the coin handling apparatus is to be assembled.

According to one embodiment, the elongate element comprises a second curved portion at a second end of the straight, elongate portion opposite to the first end, and wherein the pipe further comprises a second curved element, wherein the second curved element is rigid and has a first opening at a first end and a second opening at a second end, wherein the second curved portion of the elongate element and the second curved element are connected at the second end of the curved element to define a continuous passageway through the second curved element and the elongate element of the pipe and wherein the second curved element, at least before mounting of the pipe in the coin handling apparatus, is rotatable in relation to the elongate element, such that an angle between the first opening of the second curved element and a direction extending along the straight, elongate portion of the elongate element is variable.

Thanks to the pipe comprising a first and a second curved element arranged at opposite ends of the pipe, angles between both openings of the pipe and the direction of the elongate portion of the elongate element may be adapted to the desired configuration of the coin handling apparatus. For instance, the first opening of the first curved element and the first opening of the second curved element may be arranged in parallel planes.

According to one embodiment, one of the curved element and the curved portion of the elongate element is provided with angular markers along a perimeter and the other of the curved element and the curved portion of the elongate element is provided with an indication, such that setting of a desired relationship between the curved element and the elongate element is guided by a relationship between the indication and the angular markers.

This allows for more detailed instructions to be provided to the assembler of the coin handling apparatus, ensuring that the pipe is correctly configured before being mounted in the coin handling apparatus. Thus, clear instructions may be provided such that for controlling that a desired configuration of the coin handling apparatus will be manufactured. Also, the indications may be used in helping e.g. unskilled end users to themselves perform final assembly or adjustment of the coin dispensing apparatus.

According to one embodiment, the coin handling apparatus comprises a plurality of pipes, which are arranged between a set of first coin positions and a set of second coin positions, each pipe in the plurality of pipes being arranged for transporting coins from a first coin position in the set of first coin positions to a second coin position in the set of second coin positions.

This provides a way to fully adapt a coin handling machine comprising a set of first coin positions and a set of possible second coin positions to a cash drawer with desired denominations for each coin compartment by connecting each of the set of first coin positions to one of the set of second coin positions, each of the set of second coin positions corresponding to a position of a certain coin compartment when a cash drawer is arranged in the coin handling apparatus.

However, it is also realized that other types of coin handling apparatuses may need a flexibility in transporting coins between a set of first coin positions and a second set of coin positions, not only for outputting coins to a cash drawer. For instance, such transport may be provided in any coin handling apparatus where coins are separated based on denominations.

According to one embodiment, the plurality of pipes is configured to define passageways between a first plane defined by the set of first coin positions and a second plane defined by the set of second coin positions.

This implies that the plurality of pipes may provide several passageways side-by-side for transporting coins between the first and second planes.

The planes may be defined by a mounting part, e.g. in the form of a plate, which may simplify mounting of the plurality of pipes, as the pipes may be attached to the mounting part in mounting of the pipes.

The planes may be parallel, which may be suitable for providing a simple configuration of the coin handling apparatus. A coin transport region of the coin handling apparatus may thus be defined between two parallel planes in the coin handling apparatus.

However, it should be realized that the plurality of pipes need not necessarily be transporting coins between two planes. On the contrary, the set of first coin positions and the set of second coin positions may include one or more positions which is not arranged in the same plane as the rest of the set of coin positions. All the pipes may still be mounted to a common mounting part, which may e.g. be provided in the form of a bent plate.

According to one embodiment a plurality of dispensers associated with coin storage units is configured to dispense coins in the set of first coin positions. This implies that the coin handling apparatus may form a coin dispensing apparatus.

According to one embodiment, the coin handling apparatus is configured for receiving a cash drawer with a plurality of compartments for receiving coins in the set of second coin positions in the plurality of compartments. This implies that the coin handling apparatus may be configured for dispensing coins to a cash drawer.

According to one embodiment, the coin handling apparatus comprises guide elements for guiding insertion of the cash drawer in the coin handling apparatus. This implies that the coin handling apparatus may control a relation of the cash drawer to coin dispensers, such that coins will be dispensed in desired coin compartments in the cash drawer. Also, the guide elements eases use of the coin handling apparatus for a user that is to receive coins in the cash drawer.

According to one embodiment, the coin handling apparatus further comprises a sensor for determining that the cash drawer is properly positioned for receiving coins in the set of second coin positions in the plurality of compartments.

This increases the reliability of the coin handling apparatus. For instance, the coin handling apparatus may be configured to prevent dispensing of coins if the cash drawer is not correctly positioned within the apparatus.

According to one embodiment, the coin handling apparatus comprises a first plate having a plurality of holes defining the set of first coin positions and a second plate having a plurality of holes defining the set of second coin positions.

This implies that the first plate and the second plate may define mounting parts for mounting of the pipes. The plurality of holes may thus control positions of pipes when the pipes are mounted in the coin handling apparatus.

According to one embodiment, the plurality of holes in the second plate is adapted to a specific configuration of compartments in a cash drawer. Thus, the second plate may define a set of second coin positions associated with a specific configuration of compartments in a cash drawer, which is to be used with the coin handling apparatus.

According to one embodiment, a connection element is attached to the first plate extending towards the second plate and the second plate is configured for mounting to the connection element for setting a distance between first plate and the second plate. The connection element may thus control a configuration of the coin handling apparatus, adapting the coin handling apparatus to different heights of cash drawers. Also, the compartments of the cash drawer may define a lateral distance that coins may need to be transported. Given a maximum angle of the elongate element in relation to the plates, the lateral distance may also set requirements on the distance between the plates. Thus, the connection element may be adapted to a required distance between the first plate and the second plate.

The cash handling apparatus provides pipes which may be configured in a flexible manner in order to adapt the coin handling apparatus to a specific variation of a cash drawer to be used with the cash handling apparatus. In manufacturing of different variations of cash handling apparatuses, only the connection elements and the second plates may need to be different between different variations of cash handling apparatuses. Thus, large variations of coin handling apparatuses may be provided using common components, with only a few, very simple components being different between the variations.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
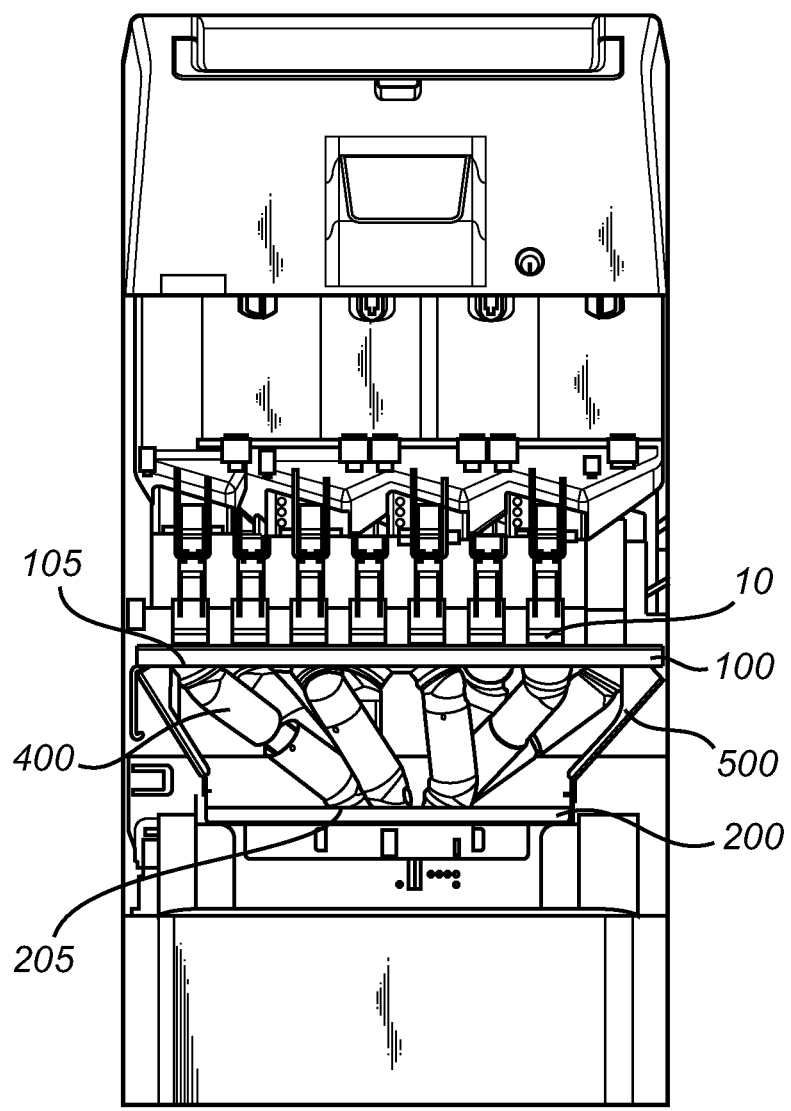
FIG. 1 is a schematic view of a coin handling apparatus.

FIG. 1 illustrates a coin handling apparatus. The below description is focused on a coin dispensing apparatus for dispensing coins into a cash drawer, but it should be realized that the invention may be used in any kind of apparatus which involves transportation of coins from a first coin position to a second coin position.

The coin handling apparatus may comprise a coin dispenser 10. The coin dispenser 10 may dispense pre-sorted coins for use with a cash drawer 300. The coin dispenser 10 may for instance be associated with a coin storage, in which coins of a specific denomination are stored.

The cash drawer 300 may be any kind of box suitable for collecting coins. The cash drawer 300 may be configured to be inserted in a cash register. The cash drawer 300 may comprise several different coin compartments for use with different denominations of coins based on a desired use of the cash drawer 300 with a cash register. However, the cash drawer 300 may be in the form of a box or bag that may be suited for carrying coins and the design of the cash drawer 300 and any coin compartments therein may not necessarily be dictated by the use of the cash drawer 300 in a cash register.

The coin dispenser 10 may be connected to a first plate 100. The first plate 100 may comprise a through-going hole through which coins may pass. The first plate 100 may be mounted parallel to the ground upon which the coin handling apparatus is situated. However, it should be realized that the first plate 100 may of course be mounted in other ways inside the coin handling apparatus.

The through-going hole may constitute a first coin position 105, from which coins may be transported. However, coins may conceivably be transported in coin handling apparatuses between many other types of components. Thus, the first coin position 105 may for example instead be defined by a coin feed to a vending machine.

A pipe 400 may be connected to the first plate 100 by way of the through-going hole. It is conceivable that the pipe 400 be mounted in adjacency with the first coin position 105 by other means than a plate 100. For example, the pipe 400 could be held in place with pins or any type of support structure.

The pipe 400 may be connected to the plate 100 by way of a snap-lock, screws, a nut-and-bolt arrangement, glue or any other suitable way of connecting a pipe 400 to a first coin position 105. The pipe 400 may further be connected to a second plate 200, by way of a through-going hole through the second plate 200. This second hole may thus constitute a second coin position 205. The arrangement of the pipe 400 being connected to the first coin position 105 and the second coin position 205 allows the pipe 400 to transport coins from the first position 105 to the second position 205.

The second plate 200 may be positioned above a space in which a cash drawer 300 may be received. The cash drawer 300 may, as mentioned above, have coin compartments for receiving certain denominations of coins in which case the coin compartment for a certain coin type being dispensed at the first coin position 105 would be placed beneath the second coin position 205. Thereby, the pipe 400 may be suitably arranged in order to guide coins from the coin dispenser 10 to a desired coin compartments of the cash drawer 300. The pipe 400 would thus be arranged to connect the first coin position 105 with the second coin position 205.

Figure 2:
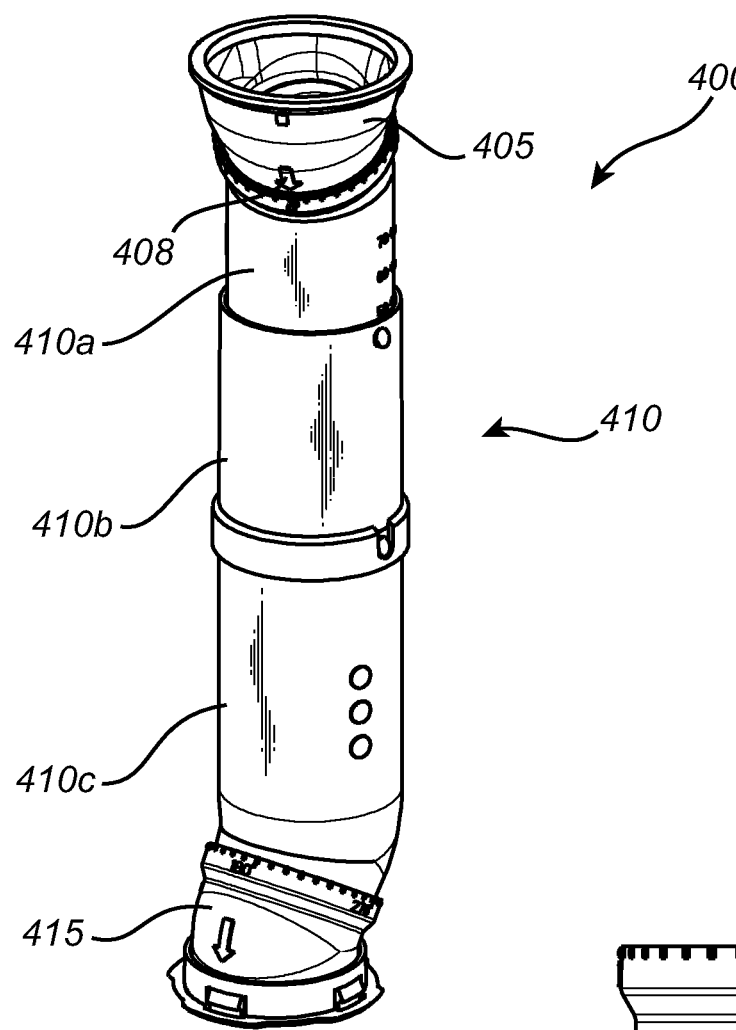
FIG. 2 is a schematic view of a pipe of the coin handling apparatus.
Figure 3A:
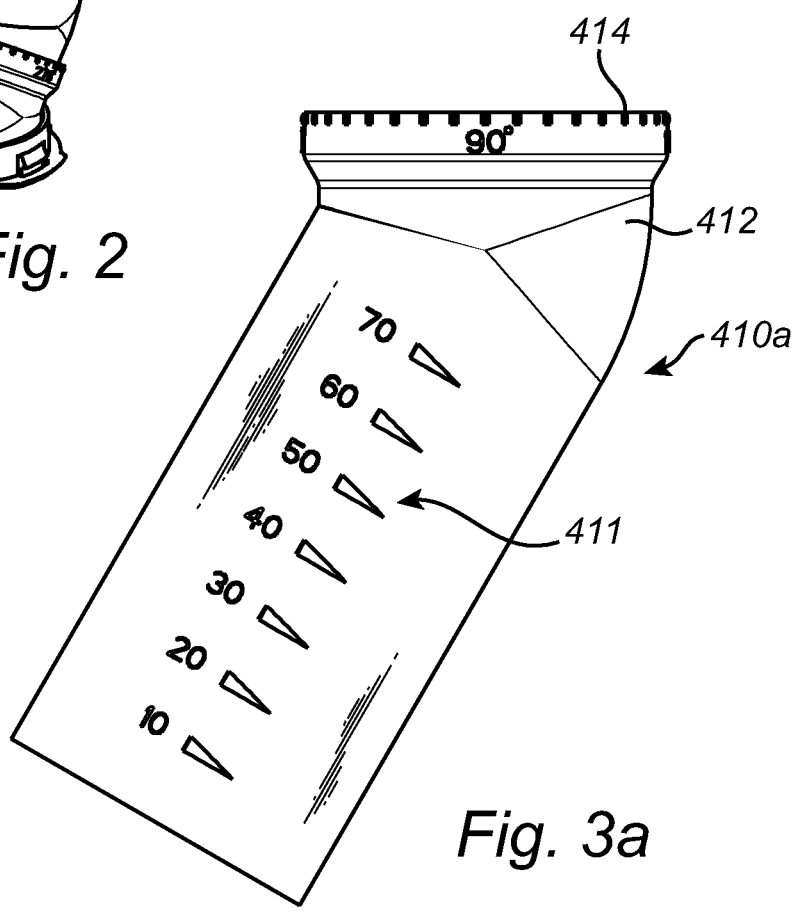
FIGS. 3a, 3b and 3c are detailed views of components of a pipe.
Figure 3B:
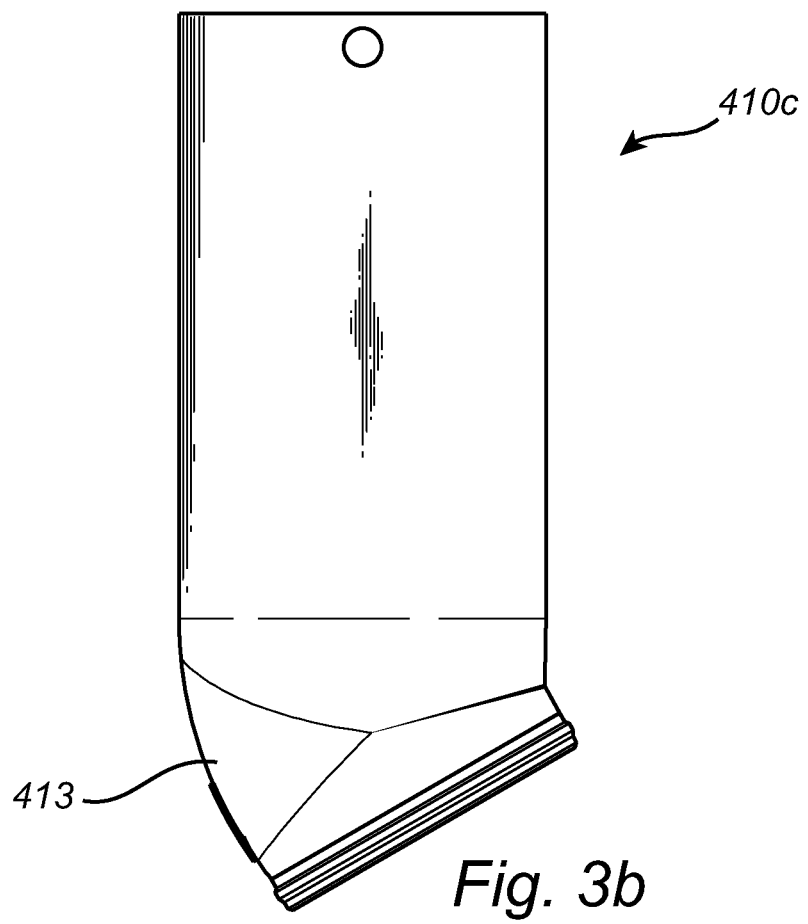
Figure 3C:
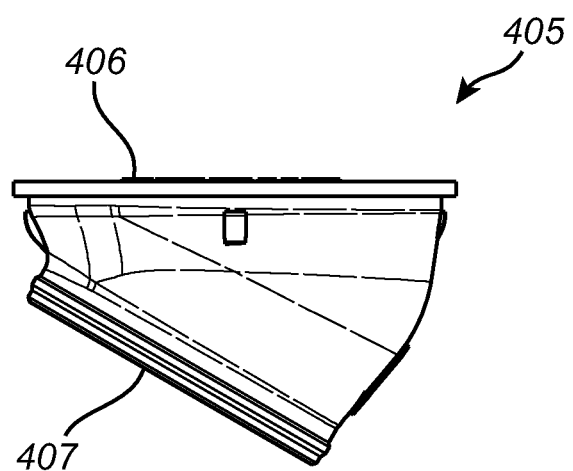

Referring now to FIG. 2 and FIGS. 3a-c, a pipe 400 will be discussed in more detail. FIG. 2 shows an assembled pipe 400, whereas FIGS. 3a-c show different components of the pipe 400.

The pipe 400 may comprise an elongate element 410. The elongate element 410 may comprise a plurality of elongate sub-sections 410a, 410b, 410c. The elongate element 410 may alternatively comprise a single part, or a different number of elongate sub-sections. The elongate subsections 410a, 410b, 410c may be mounted in such a way that they extend or retract telescopically, allowing for control of the length of the elongate element 410 without cutting or otherwise irreversibly deforming the pipe 400. The elongate subsections 410a, 410b, 410c may together define a straight, elongate portion of a passageway for transporting coins between the first position 105 and the second position 205.

In FIG. 3a, an upper elongate subsection 410a is shown in more detail and in FIG. 3b, a lower elongate subsection 410c is shown in more detail. As is clear from FIGS. 3a-b, the elongate element 410 may comprise a curved portion 412 arranged in the upper elongate subsection 410a at a first end of the elongate portion and a curved portion 413 arranged in the lower elongate subsection 410c at a second end of the elongate portion, opposite to the first end. The curved portions 412, 413 define a turn in the passageway from the straight, elongate portion.

The pipe 400 may further comprise a first curved element 405, as shown in detail in FIG. 3c. The first curved element 405 comprises two openings 406, 407. The first opening 406 lies in an imagined first plane, and the second opening 407 lies in an imagined second plane. The first curved element 405 is curved such that the first and second planes are not parallel to each other.

The first curved element 405 may be connected to the curved portion 412 so as to be rotatable in relation to the curved portion 412. As the curved portion 412 defines a turn in the passageway and the first curved element also defines a turn between the first opening 406 and the second opening 407, rotating the first curved element 405 in relation to the curved portion 412 implies that a different angular relationship between the first opening 406 and an extension of the straight, elongate portion of the elongate element 410 may be provided. This implies that the pipe 400 may be arranged with the curved element 405 attached to the first plate 100 while allowing the straight, elongate portion to extend in vastly different angles from the first plane 100.

At one extreme, the rotating of the curved element 405 in relation to the curved portion 412 may cause the curved element 405 to be arranged so as to continue a deviation from the straight portion defined by the curved portion 412. At another extreme, the rotating of the curved element 405 in relation to the curved portion 412 may cause the curved element 405 to be arranged so as to counteract the deviation from the straight portion defined by the curved portion 412. Thus, an angle between the first opening 406 and an extension of the straight, elongate portion of the elongate element 410 may be varied between these extremes.

An extent of an angle interval between the first opening 406 and an extension of the straight, elongate portion of the elongate element 410 may be set by the angle between openings 406, 407, as this angle may either co-operate with the curved portion 412 or counteract the curved portion 412. A minimum angle of a slope of the straight, elongate portion may be defined by the angle when the curved element 405 co-operates with the curved portion 412.

In the examples shown in FIGS. 3a-c, the curved portion 412 defines a 30° turn of the passageway and the curved element 405 also defines a 30° turn of the passageway. This implies that minimum angle of the slope becomes 30° in relation to a plane defined by the first plate 100, which may be parallel to the ground upon which the coin handling apparatus is situated. Such a slope may ensure that coins will fall or slide through the passageway and will not get stuck in the passageway.

In an embodiment, an angle of slope in the range of 20-40 degrees may be defined as a minimum angle for use with coin handling machines, ensuring that the coins will pass through the elongate element 410 without getting stuck. In another embodiment, an angle of slope in the range of 25-35 degrees may be defined as the minimum angle.

The first curved element 405 may be provided with a marking 408, in this case an arrow. The elongate element 410 may be provided with markings such as notches or an angular scale 414. The marking 408 of the first curved element 405 can then correlate with the markings on the elongate element 410, thereby giving a reference as to how the pipe 400 is oriented with relation to the first coin position 105. The elongate element 410 also comprises markings 411, indicating how far the elongate sub-sections 410a, 410b, 410c have been telescopically extended relative each other. This gives a reference as to how long the extension of the pipe 400 is. The markings 408, 414 and 411 may be used as guidance to an assembler when a coin handling machine is to be manufactured. The assembler may receive simple instructions to set the configuration of each pipe 400 based on the markings 408, 414 and 411. Once the correct configuration is set, the coin handling machine will also be correctly assembled.

The pipe 400 may further comprise a second curved element 415. The second curved element 415 is curved similarly to the first curved element 405. The second curved element 415 comprises a first and a second opening. The second curved element 415 may be connected to the curved portion 413 so as to be rotatable in relation to the curved portion 413. As the curved portion 413 defines a turn in the passageway and the second curved element also defines a turn between the first opening and the second opening, rotating the second curved element 415 in relation to the curved portion 413 implies that a different angular relationship between the first opening and an extension of the straight, elongate portion of the elongate element 410 may be provided in a similar manner as described above in relation to the first curved element 405.

In the example shown in FIG. 2, the first and second curved elements 410, 415 are rotated such that the first opening 406 of the first curved element 405 and the second opening of the second curved element 415 lie in parallel planes. This need not be the case if the first plate 100 and the second plate 200 do not lie in parallel planes.

Further, the pipe 400 does not necessarily comprise a second curved element 415. In cases where the coin is to be fed to a coin drop, for example, there may be no need to ensure that the pipe 400 does not misalign with the second coin position 205.

The first and/or second curved element 405, 415 may be provided with a snap-locking function. If it is desirable to secure the pipe 400 to the first coin position 105 and/or the second coin position 205, this may alternatively be done in any suitable fashion including screws, nut-and-bolt arrangements or glue.

The second curved element 415 may also be provided with a marking 418 similar to the first curved element 405, enabling a more precise reference as to how the different parts of the pipe 400 are to be oriented to connect a desired second coin position 205 to a first coin position 105.

Figure 4:
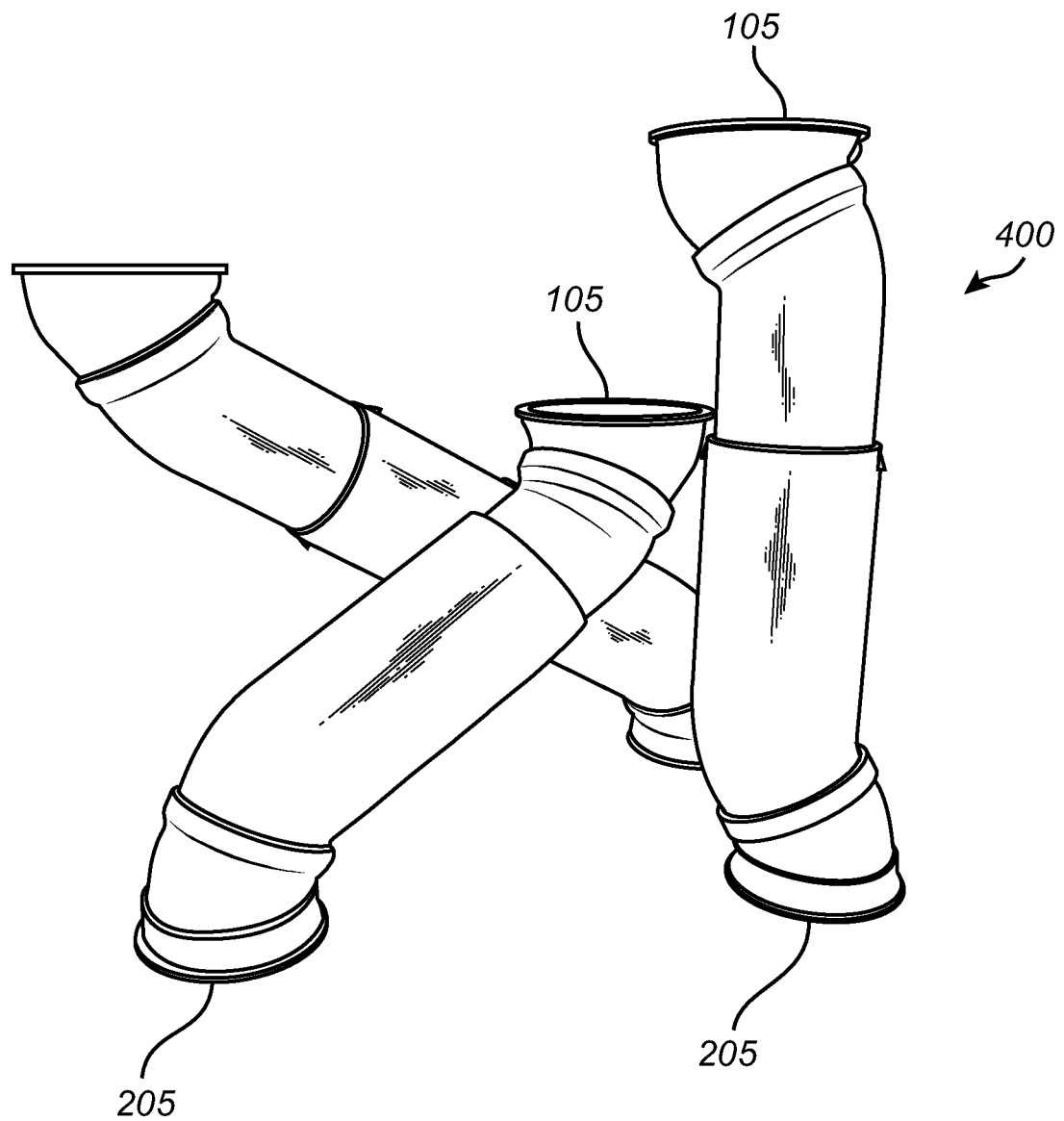
FIG. 4 is a schematic view of several pipes illustrating different configurations of pipes.

As illustrated in FIG. 4, the pipe 400 may through its construction be configured in many different lengths and angles to facilitate coin transport between a first coin position 105 and a second coin position 205 in a flexible and easily adjusted manner. Thus, in FIG. 4, three different examples of angles and lengths of the pipe 400 are illustrated, based on using the same set of elongate subsections 410a, 410b, 410c and first and second curved elements 405, 415.

Figure 5:
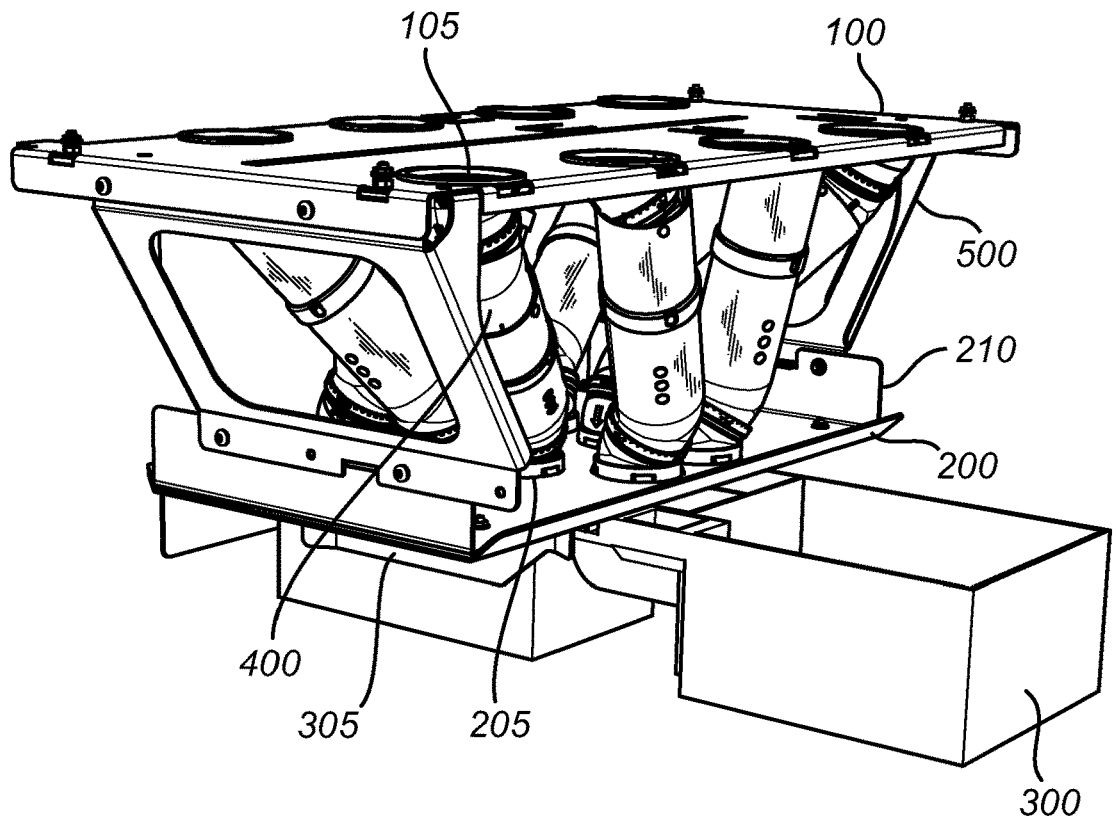
FIG. 5 is a detailed view of a plurality of pipes operating with a first type of cash drawer.
Figure 6:
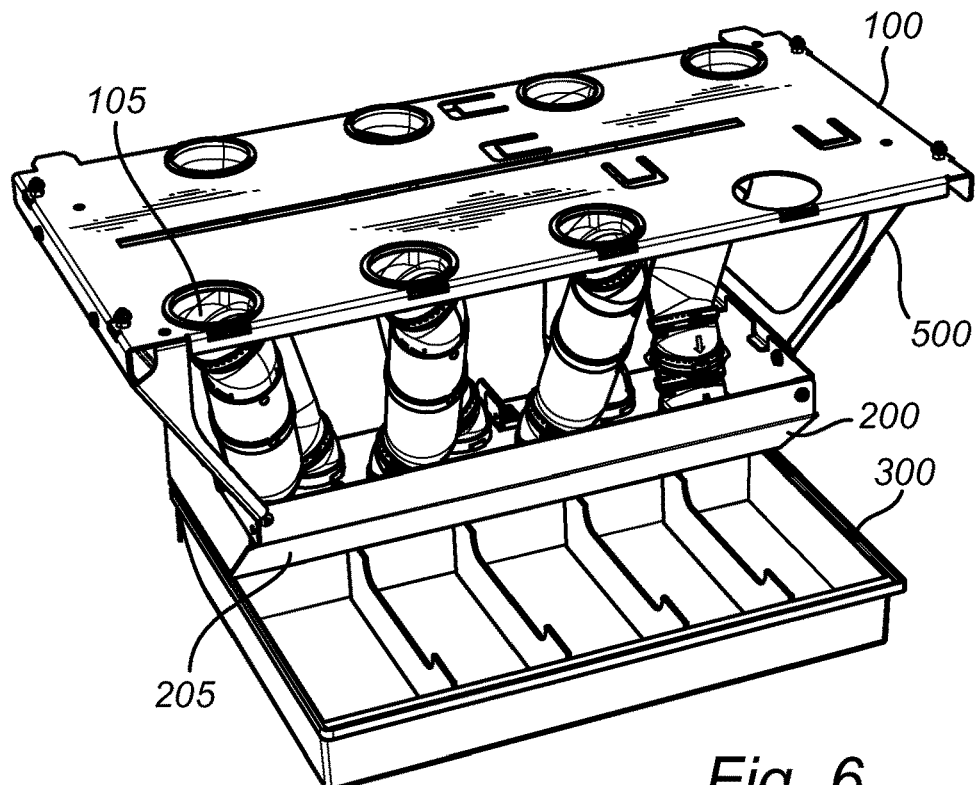
FIG. 6 is a detailed view of a plurality of pipes operating with a second type of cash drawer.

FIGS. 5-6 illustrate different configurations of pipes 400 of coin handling apparatuses. The configurations may be formed from a modular set, comprising pipes 400, a first plate 100, a second plate 200 and a connection element 500. As described above, although the pipes 400 define passageways of different lengths and with different lateral relations between the first coin position 105 and the second coin position 205, the configuration of the pipes 400 may be achieved from the same flexible pipes 400. Thus, only a single type of pipe 400 may be used and the pipe 400 may be set into the desired configuration. Further, the first plate 100 may relate to output of coins from dispensers 10. Thus, regardless of a variation of the coin handling apparatus, the first plate 100 may always be the same, as the dispensers 10 may always be mounted in the same relations.

FIGS. 5-6 illustrate that coins may be dispensed to very different set-ups of cash drawers 300. The cash drawer 300 in FIG. 5 is higher and narrower than the cash drawer 300 in FIG. 6. Thus, coins from the dispensers 10 need to be transported to very different second coin positions 205, each being defined by a hole through the second plate 200. In this case, each second coin position 205 is followed by a drop into the respective compartment of the cash drawer 300.

The second plate 200 may be connected to the first plate 100 via a connection element 500. The connection element 500 may be extendible for adapting the connection element 500 to different distances between the second plate 200 and the first plate 100. For instance, the connection element 500 may have two different parts, which may be displaceable in relation to each other depending on the desired distance between the second plate 200 and the first plate 100. Alternatively, the connection element 500 may be manufactured in different variations depending on the desired distance to be used between the second plate 200 and the first plate 100. As yet another alternative, the second plate 200 may comprise a flange 210 extending towards the first plate 100. For different variations of the second plate 200, the flange 210 may have different lengths, so as to allow the second plate 200 to be attached to the connection element 500 while setting a desired distance between the second plate 200 and the first plate 100.

The depicted portion of the coin handling apparatus in FIGS. 5 and 6 may constitute a module, which is the only part of the coin handling apparatus that differs between variations of the coin handling apparatus. Further, most components of the module may be identical and set into desired configurations. In one embodiment, only the second plate 200 is separately manufactured for different variations of the coin handling apparatus, wherein the second plate 200 sets the distance to the first plate 100 and provides through-going holes in a particular set of second coin positions 205. In an alternative embodiment, both the connection element 500 and the second plate 200 are separately manufactured for different variations of the coin handling apparatus. This enables great flexibility in manufacturing as most of the coin handling apparatus may be manufactured in the same way for each end user, including more complicated parts such as coin sorting devices, user interfaces, computers, displays and such while the module may be configured for desires of each end user.

The coin handling apparatus may also be equipped with guides 305 for the cash drawer 300. This helps ensure that the cash drawer 300 is not misaligned with the second coin positions 205. The guides 305 may also define the cash drawers 300 to be used with the coin handling apparatus, as the guides 305 may at least prevent a broad cash drawer 300 to be inserted into the coin handling apparatus. The guides 305 may be attached to, or integral with the second plate 200.

The coin handling apparatus may further be equipped with a shielding plate which may be attached to the second plate 200. The shielding plate may have corresponding through-going holes and may be mounted to extend parallel to the second plate at a small distance therefrom. The shielding plate may form a cover over any extensions of the pipes 400 through the second plate 200, such that a cash drawer 300 will not engage with ends of the pipes 400 when being inserted into the coin handling apparatus. The guides 305 may be attached to, or integral with, the shielding plate.

The coin handling apparatus may also be provided with a sensor (not shown) which may give a signal when the cash drawer 300 is correctly inserted into the coin handling apparatus. The sensor may e.g. be a pressure sensitive sensor, which is mounted at a back end of a space in which the cash drawer 300 is inserted. For instance, the sensor may be mounted to the second plate 200. When a cash drawer 300 is properly fully inserted into the coin handling apparatus, the cash drawer 300 may engage with the sensor such that sensor may provide a signal indicating that a cash drawer 300 is properly arranged in the cash handling apparatus.

A control unit of the coin handling apparatus may disable or prevent dispensing of coins from the coin dispensers 10, if the cash drawer 300 is not correctly inserted. Thus, the control unit may be configured to receive a signal from the sensor and as long as the sensor does not indicate that it is engaged by a cash drawer 300, the control unit may prevent dispensing of coins. When the sensor indicates that it is engaged by a cash drawer 300, the control unit may enable the coin handling apparatus to dispense coins into the cash drawer 300.

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, the curved portion of the elongate element of the pipe need not be integral with an elongate subsection, but may instead be a separate subsection connected to an elongate subsection which forms part of the straight elongate portion of the elongate element.

The invention claimed is:

1. A coin handling apparatus comprising:
a first coin position;
a second coin position; and
a pipe, which is arranged between the first coin position and the second coin position for transporting coins by gravity from the first coin position to the second coin position, wherein the pipe is jointed and comprises:
an elongate element with a circular cross section, wherein the elongate element is rigid and has a straight, elongate portion defining a linear transport path for the coins and a curved end portion defining a curved transport path for the coins at a first end of the straight, elongate portion, and
a curved element, wherein the curved element is rigid and has a first opening at a first end and a second opening at a second end opposite to the first end,
wherein the curved end portion of the elongate element and the curved element are connected at the second end of the curved element to define a continuously sized coin passageway with an unobstructed inner surface through the curved element and the elongate element of the pipe providing a very small risk that coins will get stuck in the passageway,
wherein the curved element, at least before mounting of the pipe in the coin handling apparatus, is rotatable about a symmetry axis of the elongate portion in relation to the elongate element, such that an angle between the first opening of the curved element and a direction extending along the straight, elongate portion of the elongate element is variable, and
wherein the elongate element comprises at least a first and second linear part, which at least before mounting of the pipe in the coin handling apparatus are telescopically movable in relation to each other in the elongate portion of the elongate element so as to allow the pipe to be adjustable to accommodate continuous passageways of different lengths, and
wherein the elongate element comprises a second curved end portion defining a curved transport path for the coins at a second end of the straight, elongate portion opposite to the first end, and wherein the pipe further comprises a second curved element, wherein the second curved element is rigid and has a first opening at a first end and a second opening at a second end, wherein the second curved end portion of the elongate element and the second curved element are connected at the second end of the curved element to define a continuously sized coin passageway with an unobstructed inner surface through the second curved element and the elongate element of the pipe providing a very small risk that coins will get stuck in the passageway, and wherein the second curved element, at least before mounting of the pipe in the coin handling apparatus, is rotatable about a symmetry axis of the elongate portion in relation to the elongate element, such that an angle between the first opening of the second curved element and a direction extending along the straight elongate portion of the elongate element is variable.

2. The coin handling apparatus according to claim 1, wherein the elongate element and the curved element are configured to define a minimum angle between the first opening of the curved element and a direction extending along the straight, elongate portion of the elongate element in dependence of the rotation of the curved element in relation to the elongate element.

3. The coin handling apparatus according to claim 1, wherein the first and second parts comprise interlocking elements defining a set of pre-defined relations between the first and second parts.

4. The coin handling apparatus according to claim 1, wherein one of the curved element and the curved end portion of the elongate element is provided with angular markers along a perimeter and the other of the curved element and the curved end portion of the elongate element is provided with an indication, such that setting of a desired relationship between the curved element and the elongate element is guided by a relationship between the indication and the angular markers.

5. The coin handling apparatus according to claim 1, wherein the coin handling apparatus comprises a plurality of pipes, which are arranged between a set of first coin positions and a set of second coin positions, each pipe in the plurality of pipes being arranged for transporting coins from a first coin position in the set of first coin positions to a second coin position in the set of second coin positions.

6. The coin handling apparatus according to claim 5, wherein the plurality of pipes is configured to define passageways between a first plane defined by the set of first coin positions and a second plane defined by the set of second coin positions.

7. The coin handling apparatus according to claim 5, wherein a plurality of dispensers associated with coin storage units is configured to dispense coins in the set of first coin positions.

8. The coin handling apparatus according to claim 7, wherein the coin handling apparatus is configured for receiving a cash drawer with a plurality of compartments for receiving coins in the set of second coin positions in the plurality of compartments.

9. The coin handling apparatus according to claim 8, wherein the coin handling apparatus comprises guide elements for guiding insertion of the cash drawer in the coin handling apparatus.

10. The coin handling apparatus according to claim 8, wherein the coin handling apparatus further comprises a sensor for determining that the cash drawer is properly positioned for receiving coins in the set of second coin positions in the plurality of compartments.

11. The coin handling apparatus according to claim 5, wherein the coin handling apparatus comprises a first plate having a plurality of holes defining the set of first coin positions and a second plate having a plurality of holes defining the set of second coin positions, wherein the plurality of pipes is mounted to the holes in the first and second plates.

12. The coin handling apparatus according to claim 11, wherein the plurality of holes in the second plate is adapted to a specific configuration of compartments in a cash drawer.

13. The coin handling apparatus according to claim 11, wherein a connection element is attached to the first plate extending towards the second plate and the second plate is configured for mounting to the connection element for setting a distance between first plate and the second plate.

* * * * *